…

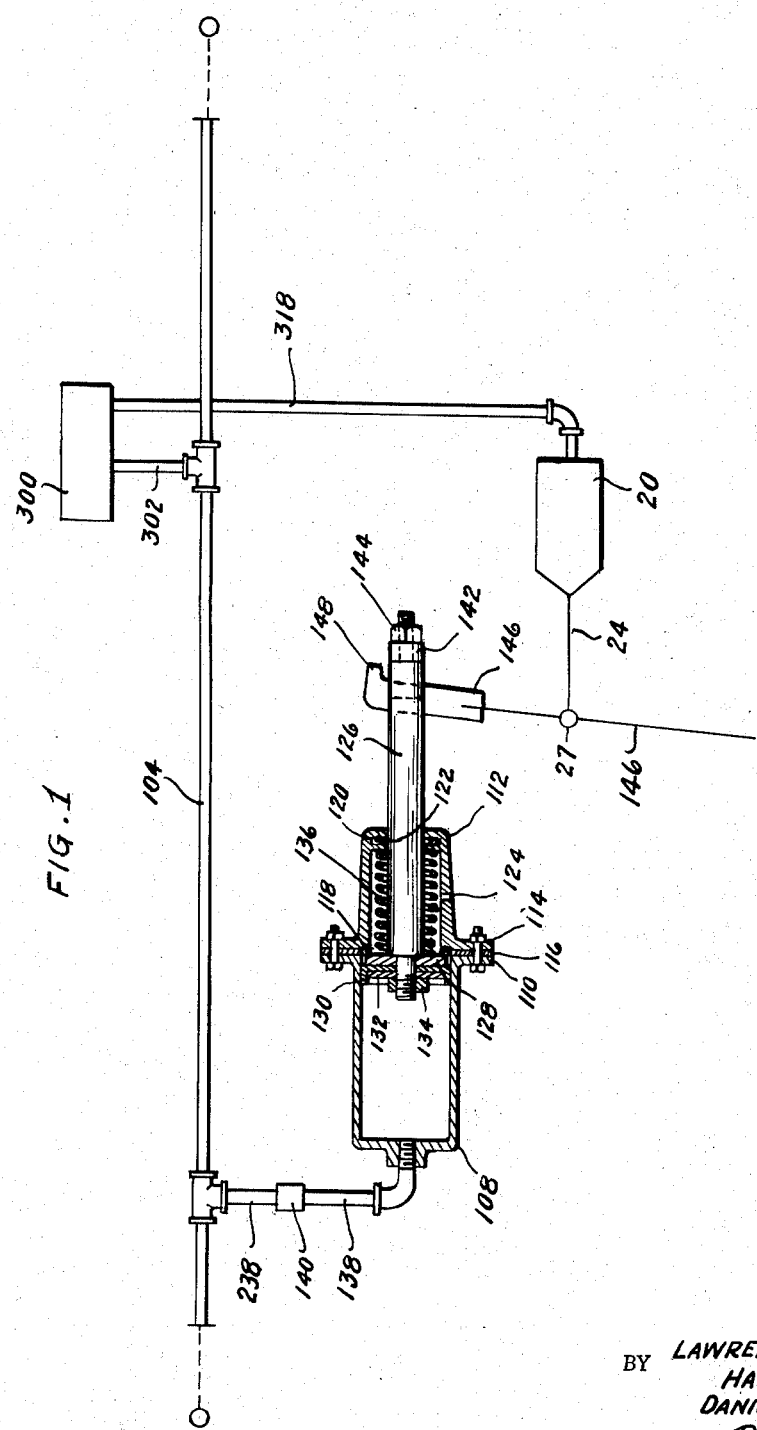

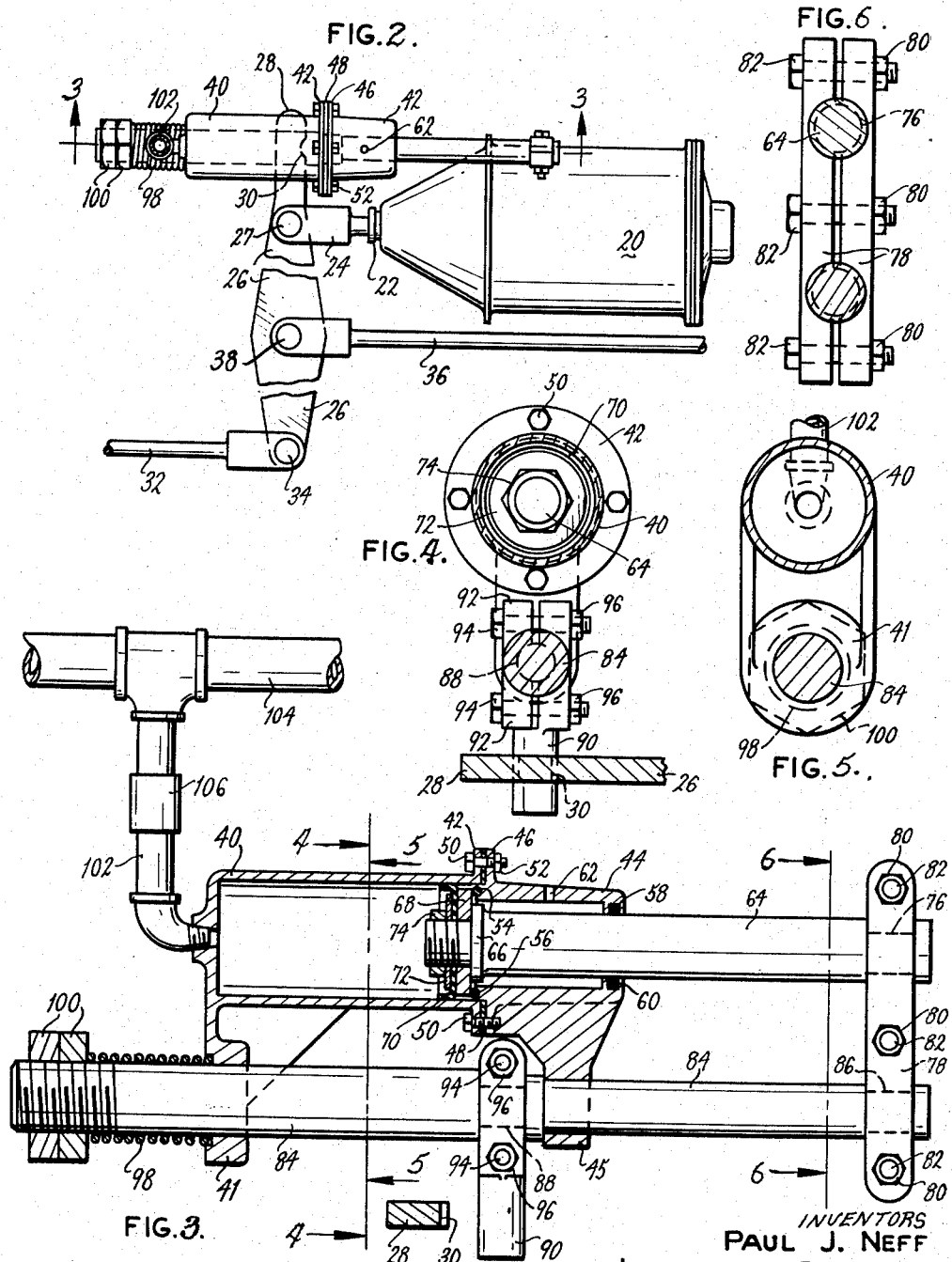

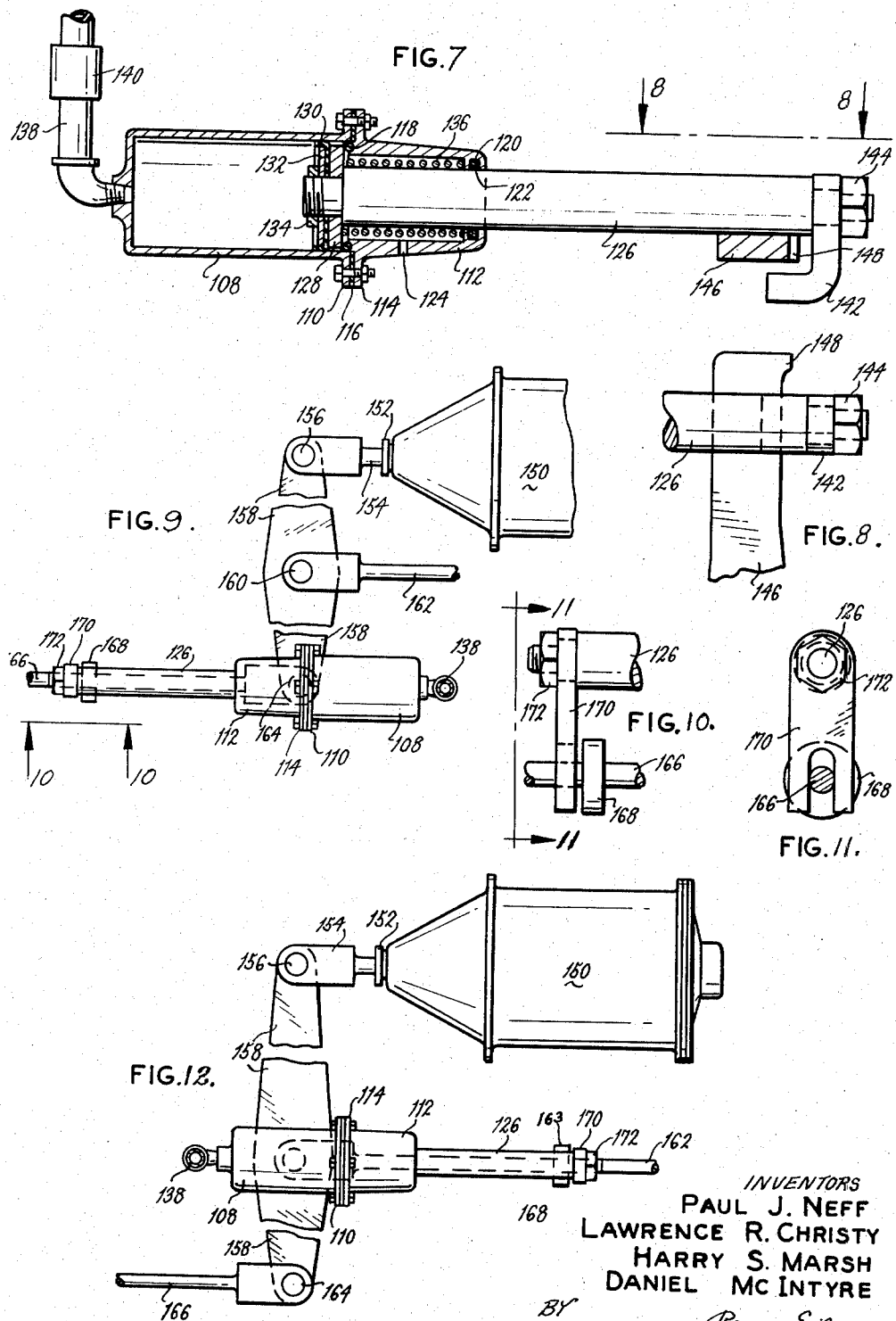

United States Patent Office

2,886,143
Patented May 12, 1959

2,886,143

AUXILIARY RETARDING DEVICE FOR DISCONNECTED ROLLER BEARING EQUIPPED RAILROAD CARS

Paul J. Neff, Clayton, Lawrence R. Christy, University City, Harry S. Marsh, Pasadena Park, and Daniel McIntyre, Affton, Mo., assignors to said Lawrence R. Christy, as trustee Application September 3, 1953, Serial No. 378,266

10 Claims. (Cl. 188—153)

This invention relates to improvements in railroad cars. More particularly this invention relates to improvements in speed-regulating devices for use on railroad cars.

It is therefore an object of the present invention to provide an improved speed-regulating device for railroad cars.

For a great number of years, all or substantially all railroad cars, including passenger as well as freight cars, were equipped with friction or solid type bearings. In recent years, some passenger cars and a very limited number of freight cars have been equipped with roller bearings rather than the standard friction or solid type bearing; but a substantial proportion of all passenger cars and virtually all freight cars are still equipped with friction or solid type bearings. Through long years of experience and practice with railroad cars that are equipped with friction or solid type bearings, locomotive engineers and other operating railroad personnel have become accustomed to the rolling characteristics and speed characteristics of railroad cars equipped with friction or solid type bearings. The locomotive engineers and other operating railroad personnel can calculate the rate of rolling and the distance which a given car will roll in switching operations where that car is equipped with friction or solid type bearings. However, where that car is equipped with roller bearings the locomotive engineer and the other operating railroad personnel must expect the car to roll faster and further than a comparable car that is equipped with friction or solid type bearings. Accordingly, the locomotive engineer and the other operating personnel must be careful to apply lesser forces to roller bearing equipped railroad cars than they apply to railroad cars that are equipped with friction or solid type bearings; else the roller bearing equipped cars could be injured and their contents injured in switching and other operations.

While it is theoretically possible for the locomotive engineers and other operating personnel to distinguish between railroad cars that are equipped with friction or solid type bearings and railroad cars that are equipped with roller bearings and can apply the proper switching forces to those cars, it would be impractical to expect such a result. Accordingly, it is desirable to provide railroad cars that are equipped with roller bearings with a device that can automatically reduce the speed of such cars during switching operations to speeds that are comparable to those attained by railroad cars equipped with friction or solid type bearings. Such a device would enable switching and like operations to be conducted in the standard and usual way without the likelihood of injury to the roller bearing equipped cars and their contents. However, this speed regulating device should become inoperative whenever the roller bearing equipped cars are connected in a train and are being moved as an integral part of that train. The present invention provides such a speed regulating device, and that device can apply a speed-restricting force to the wheels of railroad cars during switching and like operations and can automatically remove that speed-restricting force when the car is connected as an integral unit of a train equipped with a conventional air brake system. In this way, the desired speed restriction is attained during switching and like operations, but is removed whenever the car is integrated into such a train. It is therefore an object of the present invention to provide a speed-regulating device for railroad cars equipped with roller bearings; such device being adapted to apply a speed-restricting force to the wheels of the cars during switching and like operations and to automatically remove that force when the cars are integrated into trains equipped with a conventional air brake system.

The speed-restricting device provided by the present invention utilizes a spring biased latching means to maintain the existing brakes of the car in light engagement with the wheels of the car during switching and like operations, and utilizes the air pressure of the air brake system of the car to overcome the spring and remove the latching means so the brakes can become completely disengaged from the wheels when the car is integrated into a train. The device functions as an accessory to the conventional braking equipment found on railroad cars and thus requires a minimum of additional parts and entails a minimum of labor to install.

Although the speed-restricting device provided by the present invention works as an accessory to the air brake system of the railroad cars, it does not interfere with the operation of that air brake system. This is important because that air brake system is permitted to operate independently and assure proper slowing down and stopping of the train under ordinary service conditions. It is therefore an object of the present invention to provide a speed-restricting device that functions as an accessory to the air brake system of railroad cars without interfering with the operation of that air brake system.

It is a still further object of the invention to provide a device which is kept inoperative by the air pressure in the train line when the car is a part of a train, but which is adapted upon exhaustion of the air from the car to latch the braking linkage in a predetermined position. Such latching of the braking linkage keeps the previously-applied brake shoes from falling completely away from the car wheels. As a result of this latching, a speed-retarding action is attained for switching operations.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing Fig. 1 is a generally schematic, partially sectioned, view showing the air brake valve housing, the air brake cylinder, the brake pipe, and other elements of a typical air brake system associated with the speed-restricting device that is made in accordance with the principles and teachings of the present invention, Fig. 2 is a partially broken plan view of the speed-restricting device provided by the present invention and it shows a part of the air brake system for the railroad car, Fig. 3 is a longitudinal sectional view of the speed-restricting device of Fig. 2 and it is taken along the plane indicated by the line 3—3 in Fig. 2, Fig. 4 is an end sectional view of the speed-regulating device of Figs. 2 and 3 and it is taken along the plane indicated by the line 4—4 of Fig. 3, Fig. 5 is another end sectional view of the speed-regulating device of Figs. 2 and 3 and it is taken along the plane indicated by the line 5—5 in Fig. 3, Fig. 6 is still another end sectional view of the speed-regulating device of Figs. 2 and 3 and it is taken along the plane indicated by the line 6—6 in Fig. 3, Fig. 7 is a longitudinal sectional view of another form of speed-regulating device provided by the present invention, Fig. 8 is a partially broken plan view of a portion of the speed-regulating device of Fig. 7 and it is taken along the line 8—8 in Fig. 7, Fig. 9 is a partially broken plan view of another modification of the present invention, Fig. 10 is an enlarged side view of a portion of the modification shown in Fig. 9, and it is taken along the line 10—10 in Fig. 9, Fig. 11 is an enlarged sectional end view of the portion of the speed-regulating device shown in Fig. 10, and it is taken along the plane indicated by the line 11—11 in Fig. 10, and Fig. 12 is a partially broken plan view of still another modification of the speed-regulating device provided by the present invention.

Referring to the drawing in detail, the numeral 20 denotes an air brake cylinder of the type customarily provided on railroad cars. A hollow piston 22 is disposed within the air brake cylinder 20, and it is biased to the retracted position of Fig. 2 by a spring, not shown, but it can be moved outwardly from that retracted position toward brake-applying position in response to compressed air from a conventional auxiliary reservoir, not shown. A push rod 24 extends into the hollow piston 22 in telescopic relation but it is free to move relative to that piston. The push rod will, however, be moved toward brake-applying position by the inner end of that piston when that piston moves toward brake-applying position. The outer end of the push rod 24 is connected to live brake cylinder lever 26 by a pin 27. The pin 27 maintains the push rod 24 and the live cylinder lever 26 in assembled relation but permits relative rotation between them. The live cylinder lever 26 has an extension 28 formed thereon, and that extension can be provided in the original fabrication of the lever or by welding a section to the upper end of the lever if the device is applied to a lever that is already installed. A notch 30 is formed in the extension 28 of the lever 26. The numeral 32 denotes the top rod of the air brake rigging customarily provided for railroad cars. This top rod is secured to the live cylinder lever 26 by a pin 34; and that pin maintains the top rod 32 and the lever 26 in assembled relation while permitting relative rotation between them. A cylinder rod 36 is secured to the live cylinder lever 26 by a pin 38; and that pin maintains the cylinder rod 36 in assembled relation with the live cylinder lever 26 while permitting relative rotation between them. Except for the extension 28 on the live cylinder lever 26 and for the notch 30 in that extension, the air brake cylinder 20, the piston 22, the push rod 24, the lever 26, the top rod 32, the cylinder rod 36 and the pins 27, 34, and 38 are of standard and usual design and do not form a part of the present invention. These various elements are found on virtually all railroad cars and are of well known construction and manufacture. The top rod 32 and the cylinder rod 36 are suitably connected to linkages that apply brakes to the wheels of the car to slow down and stop the train. Those brakes and the linkages which operate them are of standard and usual design and do not form a part of the present invention. Those brakes and links can also be actuated by a hand brake of customary and usual design. As will later appear, the speed-regulating or retarding device provided by the present invention is intended to coact with but not to supersede the standard air brake structure and rigging on railroad cars.

The numeral 40 denotes a cylinder that will be suitably mounted on the frame of a railroad car. That cylinder will preferably have a mounting flange or plate cast on it and that flange or plate can be suitably bolted or riveted to the frame of the railroad car. The flange or plate has not been shown in the drawing since the shape of that flange or plate will be dictated by the shape of the portion of the frame of the car to which that flange or plate will be secured. A guide 41 is disposed below the cylinder 40 and is preferably formed as a part of the casting of that cylinder. A flange 42 is formed at the open end of the cylinder 40 and that flange is annular in configuration and extends radially outwardly from that cylinder. A cylinder extension 44 is disposed adjacent the open end of the cylinder 40 and has its open end in confronting relation with the cylinder 40. The cylinder extension 44 has a guide 45 disposed below it and that guide is preferably made as a part of the casting of the cylinder extension 44. A flange 46 of annular configuration is disposed adjacent the open end of the cylinder extension 44, and that flange is registerable with the flange 42 on the cylinder 40. A packing ring or washer 48 is disposed between the confronting faces of the flanges 42 and 46 of cylinder 40 and cylinder 44 respectively, and that packing ring or washer is compressed by the action of bolts 50 and nuts 52. The bolts 50 extend through the flanges 42 and 46 and the nuts are threaded onto the ends of those bolts to compress the packing ring or washer 48 and thus provide a tight seal between the cylinder 40 and the cylinder extension 44.

An annular recess 54 is formed in the end face of the cylinder extension 44 at the open end of that cylinder extension. This recess will receive and confine an O-ring 56. An annular groove 58 is provided in the wall of the cylinder extension 44 at the opposite end of that cylinder extension, and that groove will receive a felt swab 60. The O-ring may be of rubber, synthetic rubber or other resilient material which is long lived and is resistant to wear and abrasion. A vent 62 is provided in the top of the cylinder extension 44.

A piston 64 extends through the cylinder extension 44 and into the cylinder 40. This piston has a radially extending shoulder 66 thereon and a metal washer 68 bears against that shoulder. A flexible cup washer 70 is held in intimate engagement with the metal washer 68 by a metal washer 72 and a nut 74. The nut 74 is threaded onto the threaded end of the piston 64 and will be urged into intimate engagement with the metal washer 72; and this engagement will assure an intimate engagement between washer 68 and shoulder 66 and between flexible cup washer 70 and the washer 68. The flexible cup washer 70 will bear against the smooth interior of the cylinder 40 and will provide a substantially air tight seal with that surface. The piston 64 will be guided in its movement relative to the cylinder 40 by the flexible cup washer 70 and by the portions of the cylinder extension 44 that define the groove 58, and the flexible cup washer 70 will maintain a substantially air tight seal between the piston 64 and the cylinder 40 during such movement.

The piston 64 has a reduced neck 76 and that neck is embraced on the opposite sides thereof by bracket plates 78. These bracket plates are held in assembled relation by bolts 82 and nuts 80. The confronting faces of the bracket plates 78 will have semicylindrical recesses formed therein to receive and intimately engage the reduced neck portion 76 of the piston 64. Those bracket plates will also have semicylindrical recesses in the confronting faces thereof to receive and hold a reduced neck portion 86 on a rod 84. The bolts 82 and the nuts 80 will be tightened to clamp the bracket plates 78 into rigid engagement with the piston 64 and the rod 84. To all intents and purposes the bracket plates 78 will act as an integral part of the piston 64 and the rod 84 and will virtually make them a single unit. The rod 84 extends through the guide 45 on the cylinder extension 44 and it also extends through the guide 41 on the cylinder 40. These guides positively confine the rod 84 for reciprocation along a fixed path, and thus they coact with the bracket plates 78 to provide positive and guided support for the outer end of the piston 64. This guided support for the outer end of the piston 64 will coact with the flexible cup shaped washer 70 and the portions of the cylinder extension 44 adjacent the groove 58 to confine the piston 64 to a predetermined path of movement. That path of movement will be precisely coaxial with the cylinder 40 and the cylinder extension 44.

The rod 84 has a second reduced neck portion 88 and that reduced neck portion is confined by a combination latch and clamping plate 90 and a clamping plate 92. The latch consists of a cylindrical rod at the bottom of said combination latch and clamping plate and the clamping plate is at the top of said combination latch and clamping plate. The clamping plate portion of the combination latch and clamping plate 90 and the clamping plate 92 have confronting semicylindrical recesses which engage and are locked to the reduced neck portion 88 of the rod 84 by bolts 94 and nuts 96. The latch 90 extends downwardly from the rod 84 and is in register with and adjacent the extension 28 on the live cylinder lever 26 and is in register with and adjacent the notch 30 in that extension. When the actuator 90 is moved to the left, as viewed in Figs. 2 and 3, it is adapted to engage the notch 30 in the extension 28 of the live cylinder lever 26. The latch 90 is biased toward the notch 30 of the extension 28 on the live cylinder 26 by a helical spring 98 which bears against the guide 41 and is confined by nuts 100. These nuts can be adjusted along the threaded left hand end of the rod 84 and can thus vary the initial compressive forces in the spring 98. The biasing force provided by the spring 98 could also be provided by a weight, or by a compressed gas acting on a diaphragm or a bellows, or by other equivalent means, and it should be understood that wherever the word "spring" is used herein it is intended to comprehend a weight or a resilient fluid acting on a diaphragm or bellows, or any other equivalent biasing means. The spring has been shown in the drawing because it lends itself more readily to adjustability, as by movement of the nuts 100 along the threaded left hand end of the rod 84. The right hand nut will be rotated to the desired position and then the left hand nut will be used to lock the right hand nut in that position.

A conduit 102 extends from the closed end of the cylinder 40 to the train line 104 customarily provided on railroad cars. A flow restrictor 106 is provided to restrict the flow of air into and out of the cylinder 40. This flow restrictor can be an orifice or can be an elongated tube of restricted diameter, as desired. The flow restrictor 106 can be placed at any point along the length of the conduit 102 as desired. A filter, not shown, will preferably be disposed between the train line 104 and the flow restrictor 106. This air filter can be of customary and standard design and will entrap any dirt, dust or foreign matter that might plug the flow restrictor 106.

When connected in a train, the railroad car, on which the speed-regulating device of the present invention is mounted, will normally have compressed air in the train line 104. The exact amount of pressure on the compressed air in the train line under ordinary service conditions is not standardized but will generally be between seventy and eighty pounds per square inch. Compressed air in the train line 104 will pass through the conduit 102 and through the flow restrictor 106 of that conduit into the cylinder 40. In the cylinder 40 the compressed air will act upon the left hand end of the piston 64, the nut 74, the exposed area of the washer 72 and the cup shaped washer 70 and drive the piston 64 to the right. The spring 98 will resist this movement but the surface area of the piston and its various washers is designed to be great enough so that the force exerted by the compressed air on that area under such ordinary service conditions is many times the force exerted by the spring 98. The piston 64 will move to the right in response to such force until the metal washer 68 engages and is sealed in engagement with the cylinder extension 44 by the O-ring 56. The sealing engagement provided by the O-ring 56 is important since all leakage from the air brake system must be kept at an absolute minimum. The packing ring or washer 48 will prevent leakage of air from between the cylinder 40 and the cylinder extension 44 and the O-ring 56 will prevent leakage of air between the piston 64 and the cylinder extension 44. At this time, the latch 90 will be out of engagement with the notch 30 and the extension 28 of the live cylinder lever, and the hollow piston 22 will have been retracted within the cylinder 20 by the returning spring, not shown, within the cylinder 20. The weight of the brake shoes and brake linkage will be free to move the line cylinder lever into brake-releasing position. Compressed air from the train line 104 will pass through the valve system of the air brakes and into the auxiliary and emergency reservoirs of the air brake system and as long as the pressure in the train line 104 is equal to or above the level of the pressure in the auxiliary or emergency air brake reservoirs, not shown, the weight of the brake shoes and the brake linkage will keep the live cylinder lever 26 in brake-releasing position. The train is thus free to start with no speed-restricting forces applied to the wheels by the speed-regulating device of the present invention.

When it is desired to slow or stop a train, equipped with a conventional air brake system and with the device of the present invention, the pressure on the air in the train line 104 is reduced a limited amount, as for example ten to fifteen pounds; and thereupon the auxiliary reservoir, not shown, will supply air to the air brake cylinder 20 and force the hollow piston 22 to move outwardly and rotate the live cylinder lever 26 in a counter clockwise direction, as viewed in Fig. 2. Such rotation will move the notch 30 of the extension 28 away from the latch 90 and will move the cylinder rod 36 to the left and will move the top rod 32 to the right as viewed in Fig. 2. Such movement of the rods 36 and 32 will apply the brakes to the wheels of the car through the medium of the usual and standard air brake rigging. The force and duration of the braking will be controlled by the amount of the reduction in pressure on the air in the train line 104 and by the length of time the reduced pressure is continued. The cylinder 40, the piston 64, and spring 98 are so designed that limited reduction in pressure effected in the train line 104 for ordinary service braking will still leave more than enough pressure in the cylinder 40 to overcome the force exerted by the spring 98; and thus the latch 90 will not be moved during such ordinary service braking of the train. As a result, the air brake system provided on the railroad car can operate freely and fully during ordinary service braking without interference from the speed-regulating device provided by the present invention. That is to say, as long as the railroad car is connected in a train the air pressure in the train line 104 will be sufficient during ordinary service braking to maintain the piston 64 and the latch 90 in the positions shown in Fig. 3; and in this position the latch 90 is held out of the path of movement of the live cylinder lever 26 and the extension 28 thereon.

When the connection between the train line 104 and the locomotive is broken, as is the case in the switching of freight cars, the pressure in the train line will fall to atmospheric pressure and the valve system of the air brake system will apply air from the auxiliary and emergency reservoirs to the air brake cylinder 20, and thereupon the piston 22 will be moved out of that cylinder and force the live cylinder lever 26 to full braking position. In switching freight cars, it is necessary to pull the release rods which permit the compressed air to escape from the emergency and auxiliary reservoirs and from the air brake cylinder 20. Thereupon the restoring spring in the air brake cylinder 20 will pull hollow piston 22 into the retracted position of Fig. 2, and the weight of the brake shoes and brake linkage will move the live cylinder lever 26 out of full braking position and will tend to move that live cylinder lever into fully released position. However, before the live cylinder lever can attain fully released position, it will engage and be held by the latch 90. That latch was moved to the left, as viewed in Fig. 3, by the spring 98 when the air in cylinder 40 bled back through conduit 102 and flow restrictor 106 to the train pipe, and thence to the atmosphere. The holding pressure exerted on the live cylinder lever 26 by the latch 90 will be directly controlled by the compressive forces in the spring 98; and those forces will be adjusted to apply just sufficient frictional forces to the wheels of the railroad car to enable that car to roll at the same rate that a car equipped with solid or friction type bearings would roll.

The desired strength of the spring 98 can be closely approximated through calculations and can be finally established by the adjustment of the nuts 100. The range of empty weights of railroad cars is quite wide, and therefore it will be desirable to establish three or four different sizes and weights of springs to accommodate different ranges of empty weights for cars. The final adjustment for the particular weight of any car in any range can be made by setting the nuts 100. Thus, the empty weights of freight cars can range from thirty thousand pounds to as much as one hundred and twenty thousand pounds, and one size and weight of spring could accommodate the range from thirty thousand to fifty two thousand five hundred pounds, a second spring could accommodate the range from fifty two thousand five hundred pounds to seventy five thousand pounds, a third spring could accommodate the range from seventy five thousand to ninety seven thousand five hundred pounds, and a fourth spring could accommodate the range from ninety seven thousand five hundred pounds to one hundred and twenty thousand pounds.

As long as the connection between the car on which the device of the invention is mounted and the locomotive is broken, the spring 98 will keep latch 90 in engagement with line lever extension 28 to maintain a speed-restricting force upon the wheels of the car, by holding the air brake rigging in a light engagement with the wheels of the car. This engagement will not be a substitute for the hand brake of the car but instead will merely restrict the speed at which the roller-bearing equipped cars will roll to the speed at which solid or friction bearing equipped cars will roll. If the car is to be held stationary, the hand brake will be operated in the usual and customary way.

As soon as the train line 104 is again connected to the air brake system of a train and is suitably charged with compressed air, the force exerted on the piston 64 and the washers connected thereto, will force that piston to the right, as viewed in Figs. 2 and 3, and wil overcome the force of spring 98. The latch 90 will once again move out of engagement with and out of the path of movement of the live cylinder lever 26 and the extension 28 thereof. In this way the speed-regulating device provided by the present invention simulates the lower rolling speeds of friction or solid bearing equipped railroad cars during switching operations but automatically permits full use of the faster rolling characteristics of roller bearing equipped cars when the car is connected in a train.

It will be noted that when the piston 64 is at the extreme end of its length of travel toward free rolling position, the latch 90 is displaced from the path of travel of the live cylinder lever 26, which is the movable element of the air brake rigging that the piston actuates through the latch 90. It should also be noted that when the latch 90 moves toward speed-restricting position, it moves through a path that is partially coextensive with the path of movement of the live cylinder lever 26, but the latch 90 does not move to full braking position. That full braking position is attained by the live cylinder lever 26 only under the influence of the piston 22 of the air brake cylinder 20.

The flow restrictor 106 is desirable because it avoids excessively sudden applications of force to the piston 64, the bracket plates 78, the rod 84, the spring 98 and the latch 90. However, that flow restrictor will readily pass sufficient air into and out of the cylinder 40 to enable the pressure in that cylinder to quickly adjust to the level of pressure in the train line 104.

The latch 90 is essentially a part of the piston and it is obvious that its function could be performed by other means associated with the piston.

Fig. 7 discloses an alternate construction of a speed-regulating device embodying the invention. That device includes a cylinder 108 which has a radially extending annular flange adjacent the open end thereof. A cylinder extension 112 has a radially extending annular flange 114 that is registerable with the flange 110 and the cylinder 108. A packing ring or washer 116 is disposed between and seals the flanges 110 and 114 of the cylinder 108 and the cylinder extension 112. An O-ring 118 is disposed in a groove in the left hand end wall of the cylinder extension 112 and a felt swab 122 is disposed in an annular groove 120 at the right hand end of the cylinder extension 112. A vent 124 is provided in the cylinder extension 112. Except for the elimination of the guides 41 and 45 on the cylinder and cylinder extension respectively, the cylinder 108 and the cylinder extension 112 are identical with the cylinder 40 and the cylinder extension 44 of Figs. 2–6.

A piston 126 extends through the cylinder extension 112 and into the cylinder 108. This piston has a metal washer 128 on the end thereof and has a second metal washer 132 which coacts with the washer 128 to clamp a flexible cup washer 130 therebetween. A nut 134 is threaded onto the end of the piston 126 to maintain the washers 128, 130 and 132 in intimate engagement. The metal washer 128 bears against and is guided by the inner surface of the cylinder 108, and the flexible cup washer 130 bears against the inner surface of the cylinder 108 and forms a substantially air tight seal therebetween. The metal washer 128 can bear against the O-ring 118 when the piston is in its right hand position and will coact with that O-ring 118 to provide a seal between the piston and the cylinder extension 112. The packing ring or washer 116 will provide an air tight seal between the cylinder 108 and the cylinder extension 112. A preloaded helical spring 136 is disposed within the cylinder extension 112 and it bears against the washer 128 and against the portions of cylinder extension 112 which define the groove 120. This spring will normally bias the piston to the left, as viewed in Fig. 7, but will be overcome by the forces exerted on the piston and its associated washers by compressed air in the cylinder 108. The right hand end of the piston 126 has engaging means preferably in the form of a hook 142 thereon and that hook is held in position by a nut 144 on the end of the piston 126. This hook extends down below and will underlie the extension 146 of a live cylinder lever whenever that live cylinder lever is in fully released position. A projection 148 is formed on the outer end of the extension 146 to prevent accidental separation of the live lever and the hook 142, when that lever and hook are in engagement with each other. The spring 136 will normally be held in compressed position, as shown in Fig. 7 by air conducted to the cylinder 108 by the conduit 138 which has a flow restrictor 140 intermediate the ends thereof. However, when the pressure in the cylinder 108 is exhausted back through the conduit 138 and the flow restrictor 140 to the train line, not shown, and vents to the atmosphere, the spring 136 will force the piston 126 to the left. At such time the hook 142 will engage and restrain the extension 146 in the manner in which the latch 90 engages and restrains extension 28, as heretofore described.

The operation of the speed-regulating device of Fig. 7 is closely comparable to the operation of the speed-regulating device of Figs. 2–6. The principal difference between the two speed-regulating devices is that the spring 136 in Fig. 7 cannot be adjusted. However, the spring in each of these devices will act upon intermediate mechanisms to latch the live cylinder lever in predetermined position and thus apply speed-restricting forces to the wheels on both sets of trucks of the railroad cars.

In some instances it may not be necessary or desirable to apply speed-restricting forces to the wheels on both trucks of the railroad car. In such case, the speed-regulating device can cooperate with either the top rod or the cylinder rod of the air brake rigging and thus apply speed-restricting forces to the wheels on one or the other of the trucks of the railroad car. In Figs. 9–11 for example, the piston 126 cooperates with the top rod 166 rather than with the live cylinder lever 158. The live cylinder lever is in this case connected to the push rod 154 of an air brake cylinder 150 by a pin 156. The push rod 154 extends into a hollow piston 152. The live cylinder lever 158 is also connected to the cylinder rod 162 by a pin 160 and to the top rod 166 by a pin 164. The piston 126 will respond to the spring 136 within the cylinder extension 112 or to the air pressure in the cylinder 108 as supplied by the conduit 138. A collar or upset 168 is provided on the top rod 166, and a yoke 170 is secured to the end of the piston 126 by a nut 172. This yoke will normally be out of engagement with the collar or upset 168 but can be moved into latching relation with that collar or upset by the action of the spring 136. When the spring 136 moves the yoke 170 into latching relation with the collar or upset 168, the top rod 166 will be latched into speed-restricting position and will apply a light pressure to the wheels of one truck of the railroad car through the medium of the air brake rigging in the same manner that latch 90 maintains live lever 26 in desired position.

If desired, the speed-restricting forces can be applied to the cylinder rod 162. In that case the cylinder 108 is reversed from the position of Fig. 9 and the yoke 170 selectively functions to latch a collar or upset 163 on the cylinder rod 162. The yoke 170 will normally be out of engagement with the collar or upset 163 but can respond to the force of spring 136 to latch that collar or upset to provide speed-restricting forces to the wheels of the other truck of the railroad car through the air brake rigging.

By use of the speed-restricting device of the present invention it is possible to enable roller bearing equipped railroad cars to simulate the rolling speeds of railroad cars that are equipped with friction or solid type bearings during switching or like operations, and yet to enable the roller bearing equipped cars to attain full use of their increased rolling speed when they are integrated into a train. The speed-restricting devices will not interfere with the operation of the air braking systems of the railroad cars during service operation but will automatically come into play when the compressed air in those systems is released for switching and like operations. When the car is again integrated in a train, the air pressure from the air brake pipe will automatically remove the speed-restricting forces on the car.

Referring to Fig. 1, the numeral 300 denotes the housing of an air brake valve of standard and usual construction; and that housing is connected to the brake pipe 104 of Fig. 2 by a pipe 302. A pipe 318 extends between the housing 300 and the air brake cylinder 20. The piston within the cylinder 20 operates the push rod 24; and that push rod is connected to the live brake cylinder lever 146 by a pivot 27.

In the normal position of the various elements of the air brake system, the push rod 24 is retracted within the air brake cylinder 20, and the brake shoes, not shown, respond to their own weight plus the weight of the brake linkage to remain out of engagement with the car wheels, not shown. The auxiliary and emergency reservoirs, not shown, of the air brake system are filled with compressed aid from the brake pipe 104, but the valves in the housing 300 keep that air from passing to the air brake cylinder 20. When the brakes are to be applied under service conditions, the air pressure in the brake pipe 104 is reduced and the valves in the housing 300 direct air from the auxiliary reservoir to the cylinder 20. Thereupon, the push rod will move to the left in Fig. 1 and will enable the lever 146 to cause the brake shoes to be applied against the wheels. When the brakes are to be applied under emergency conditions, the air from both the auxiliary and emergency reservoirs is supplied to the cylinder 20, and a stronger force will be applied to the push rod 24. The operation of the brake system shown by Fig. 1 is conventional and is well known to those skilled in the art.

Whereas several preferred embodiments of the present invention have been shown and described in the drawing and accompanying description it should be apparent to those skilled in the art that various changes may be made in the form of the invention without affecting the scope thereof.

What we claim is:

1. In a railroad car that is equipped with roller bearings and that has a train line for compressed air and that has air brakes including brake shoes and a brake rigging with a movable element that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is disposed within, and is reciprocable relative to said cylinder, a latch connected with said piston, a compression spring that biases said piston to dispose said latch in the path of said movable element and to engage and hold said movable element in a position intermediate full braking and fully released positions and thereby enable said brake shoes to apply a predetermined small speed retardation to said railroad car that will provide restricted rolling of said railroad car, and a conduit that extends between said cylinder and said train line to supply compressed air to said cylinder to enable said piston to move said latch out of the path of said movable element, said piston responding to said compressed air under service conditions to move said latch out of the path of said movable element and to hold said latch out of the path of said movable element and thereby permit said movable element and said brake shoes to move to fully released position and provide unrestricted free rolling of said railroad car, said piston responding to said spring whenever said compressed air is exhausted to move said latch into the path of said movable element and to engage and hold said movable element in said intermediate position.

2. In a railroad car that is equipped with roller bearings and that has a train line for compressed air and that has air brakes including brake shoes and a brake rigging with a movable element that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is carried by and is reciprocable relative to said cylinder, a latch connected with said piston, said piston being biased to move said latch into position to hold said movable element in a position intermediate full braking and fully released positions and thereby enable said brake shoes to apply a predetermined small speed retardation to said railroad car that will provide restricted rolling of said railroad car, and a conduit that extends between said cylinder and said train line to supply compressed air to said cylinder to enable said piston to move said latch out of holding position, said piston responding to said compressed air under service conditions to move said latch out of holding position and thereby permit said movable element and said brake shoes to move to fully released position and provide unrestricted free rolling of said railroad car, said piston responding to the bias thereon whenever said compressed air in said train line is exhausted to move said latch into position to hold said movable element in said intermediate position.

3. In a railroad car that is equipped with roller bearings and that has a train line for compressed air and that has air brakes including brake shoes and a brake rigging with a live brake cylinder lever that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is carried by and is reciprocable relative to said cylinder, a latch connected with said piston and that is registerable with said live brake cylinder lever, a spring that biases said piston to dispose said latch in the path of said live brake cylinder lever and to hold said live brake cylinder lever in a position intermediate full braking and fully released positions and thereby enable said brake shoes to apply a predetermined small speed retardation to said railroad car that will provide restricted rolling of said railroad car, and a conduit that extends between said cylinder and said train line to supply compressed air to said cylinder to enable said piston to move said latch out of the path of said live brake cylinder lever, said piston responding to said compressed air under service conditions to move said latch out of the path of said live brake cylinder lever and to hold said latch out of the path of said live brake cylinder lever and thereby permit said live brake cylinder lever and said brake shoes to move to fully released position and provide unrestricted free rolling of said railroad car, said piston responding to said spring whenever said compressed air is exhausted to move said latch into the path of said live brake cylinder lever and to engage and hold said live brake cylinder lever in said intermediate position.

4. In a railroad car that is equipped with roller bearings and that has a train line for compressed air and that has air brakes including brake shoes and a brake rigging with a movable element that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is carried by and is reciprocable relative to said cylinder, a latch connected with said piston, said piston moving said latch through a predetermined path of reciprocation, said movable element being movable to one end of a second predetermined path of reciprocation by the compressed air of said air brakes and being movable to the opposite end of said second path of reciprocation by said brake shoes as they move to fully released position, said paths of reciprocation being coextensive in part but having one end of the first said path disposed beyond said opposite end of second path so said latch can move to the said one end of the first said path and free said movable element for movement throughout said second path, said piston being biased to move said latch to the other end of the first said path to hold said movable element adjacent but short of the said one end of said second path and thereby enable said brake shoes to apply a predetermined small speed retardation to said railroad car that will provide unrestricted rolling of said railroad car, and a conduit that extends between said cylinder and said train line to supply compressed air to said cylinder to enable said piston to move said latch to said one end of the first said path, said piston responding to said compressed air under service conditions to move said latch to said one end of the first said path and thereby permit said movable element and said brake shoes to move to fully released position and provide unrestricted free rolling of said railroad car, said piston responding to the bias thereon whenever said compressed air in said train line is exhausted to move said latch to the other end of the first said path.

5. In a railroad car that is equipped with roller bearings and that has a train line for compressed air and that has air brakes including brake shoes and a brake rigging with a movable element that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is carried by and is reciprocable relative to said cylinder, a latch connected with said piston, said movable element responding to braking air pressure to move into full braking position but responding to the weight of said brake shoes to move to fully released position when said braking air pressure is released, said piston being biased to move said latch into position to intercept said movable element shortly after said movable element starts to move from full braking position and thereby hold said movable element in a position where said brake shoes apply a predetermined small speed retardation to said railroad car that will provide restricted rolling of said railroad car, and a conduit that extends between said cylinder and said train line to supply compressed air to said cylinder to enable said piston to move said latch out of intercepting position, said piston responding to said compressed air under service conditions to move said latch out of intercepting position and thereby permit said movable element and said brake shoes to move to fully released position and provide unrestricted free rolling of said railroad car, said piston responding to the bias thereon whenever said compressed air in said train line is exhausted to move said latch into intercepting position.

6. In a railroad car that is equipped with roller bearings and that has a train line for compressed air and that has air brakes including brake shoes and a brake rigging with a movable element that responds to compressed air to move said brake shoes to full braking position and that is moved to fully released position as said brake shoes move to fully released position, the improvement which includes a speed-retarding device that can selectively permit unrestricted free rolling of said railroad car or can permit restricted rolling of said railroad car and that comprises a cylinder, a piston that is carried by and is reciprocable relative to said cylinder, a latch connected with said piston, said piston being biased to move said latch into position to hold said movable element adjacent but short of full braking position and thereby enable said brake shoes to apply a predetermined small speed retardation to said railroad car that will provide restricted rolling of said railroad car, and a conduit that extends between said cylinder and said train line to supply compressed air to said cylinder to enable said piston to move said latch out of holding position, said piston responding to said compressed air under service conditions to move said latch out of holding position and thereby permit said movable element and said brake shoes to move to fully released position and provide unrestricted free rolling of said railroad car, said piston responding to the bias thereon whenever said compressed air in said train line is exhausted to move said latch into position to hold said movable element, said piston responding directly to the exhaustion of the compressed air in said train line while said movable element responds only indirectly to the exhaustion of the compressed air in said train line, whereby said piston moves said latch into holding position while said movable element is still held in full braking position by compressed air.

7. In a railroad car which is equipped with roller bearings and which has a train line for compressed air and has air brakes including brake shoes and a brake rigging with a movable element that responds to compressed air to move asid brake shoes to full braking position and that can move to fully released position to permit said brake shoes to move to fully released position, the improvement which comprises a cylinder, a piston that is carried by and is reciprocable relative to said cylinder, a latch connected with said piston, said piston being biased to move said latch to hold said movable element in a position adjacent but short of full braking position and thereby enable said brake shoes to apply a predetermined small speed retardation to said railroad car which provides restricted rolling of said railroad car, and a conduit that extends between said cylinder and said train line to supply compressed air to said cylinder, said compressed air under service conditions overcoming said bias on said piston to permit said movable element to move to fully released position and thereby provide unrestricted free rolling of said railroad car, said piston responding to said bias whenever said compressed air in said train line is exhausted to hold said movable element in said position adjacent but short of full braking position.

8. In a railroad car which is equipped with roller bearings and which has a train line for compressed air and has air brakes including brake shoes and a brake rigging with a movable element that reponds to compressed air to move said brake shoes to full braking position and that can move to fully released position to permit said brake shoes to move to fully released position, the improvement which comprises a cylinder, a piston that is carried by and is reciprocable relative to said cylinder, a latch connected with said piston, said piston being biased to move said latch into the path of said movable element and to hold said movable element in a position intermediate full braking and fully released positions and thereby enable said brake shoes to apply a predetermined small speed retardation to said railroad car which provides restricted rolling of said railroad car, a conduit that extends between said cylinder and said train line to supply compressed air to said cylinder to overcome said bias on said piston, and a flow restrictor in said conduit, said compressed air under service conditions overcoming said bias to permit said movable element to move to fully released position and thereby provide unrestricted free rolling of said railroad car, said piston responding to said bias whenever said compressed air in said train line is exhausted to hold said movable element in said intermediate position, said flow restrictor preventing sudden applications of force to the said piston and said latch.

9. In a railroad car which is equipped with roller bearings and which has a train line for compressed air and has air brakes including brake shoes and a brake rigging with a movable element that responds to compressed air to move said brake shoes to full braking position and that can move to fully released position to permit said brake shoes to move to fully released position, the improvement which comprises a pneumatic device that has a portion thereof which is movable relative to said movable element of said brake rigging and which selectively disposes a latching surface in the path of said movable element of said brake rigging, said portion of said pneumatic device tending to hold said latching surface in the path of movement of said movable element of said brake rigging to hold said movable element of said brake rigging in a position adjacent but short of full braking position and thereby enable said brake shoes to apply a predetermined, small speed retardation to said railroad car which provides restricted rolling of said railroad car, and a conduit that extends between said pneumatic device and said train line to supply compressed air to said pneumatic device, said portion of said pneumatic device moving said latching surface out of the path of said movable element of said brake rigging to free said movable element of said brake rigging for movement to fully released position whenever the air pressure in said train line is above a predetermined value, said portion of said pneumatic device returning said latching surface to the path of movement of said movable element of said brake rigging to hold said movable element of said brake rigging in said position adjacent but short of said full braking position whenever the compressed air in said train line is exhausted.

10. In a railroad car which is equipped with roller bearings and which has a source of compressed air and has air brakes including brake shoes and a brake rigging with a movable element that responds to compressed air to move said brake shoes to full braking position and that can move to fully released position to permit said brake shoes to move to fully released position, the improvement which comprises a pneumatic device that has a portion thereof which is movable relative to said movable element of said brake rigging and which selectively disposes a latching surface in the path of said movable element of said brake rigging, said latching surface being biased for movement into said path of movement of said movable element of said brake rigging to hold said movable element of said brake rigging in a position adjacent but short of full braking position and thereby enable said brake shoes to apply a predetermined, small speed retardation to said railroad car which provides restricted rolling of said railroad car, and a conduit that extends between said pneumatic device and said source of compressed air to supply compressed air to said pneumatic device, said portion of said pneumatic device moving said latching surface out of the path of movement of said movable element of said brake rigging to free said movable element of said brake rigging for movement to fully released position whenever the air pressure in said source of compressed air is above a predetermined value, said portion of said pneumatic device moving said latching surface into position to intercept said movable element of said brake rigging and to hold said movable element of said brake rigging adjacent but short of said full braking position whenever the compressed air in said source of compressed air is exhausted.

References Cited in the file of this patent

UNITED STATES PATENTS

| | | |
|---|---|---|
| 2,211,890 | Farmer | Aug. 20, 1940 |
| 2,258,784 | McNeal | Oct. 14, 1941 |
| 2,409,908 | Simpkins | Oct. 22, 1946 |
| 2,531,055 | Kirk | Nov. 21, 1950 |